United States Patent
Saito

(10) Patent No.: US 12,080,077 B2
(45) Date of Patent: Sep. 3, 2024

(54) SIGNAL RECOGNIZING APPARATUS

(71) Applicant: TOYOTA JIDOSHA KABUSHIKI KAISHA, Toyota (JP)

(72) Inventor: Hiroki Saito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 17/738,353

(22) Filed: May 6, 2022

(65) Prior Publication Data

US 2023/0005276 A1  Jan. 5, 2023

(30) Foreign Application Priority Data

Jul. 2, 2021  (JP) .................... 2021-110557

(51) Int. Cl.
 *G06T 7/70* (2017.01)
 *G06T 7/60* (2017.01)
 *G06V 10/24* (2022.01)
 *G06V 20/58* (2022.01)

(52) U.S. Cl.
 CPC .............. *G06V 20/584* (2022.01); *G06T 7/60* (2013.01); *G06T 7/70* (2017.01); *G06V 10/243* (2022.01); *G06T 2207/30252* (2013.01)

(58) Field of Classification Search
 CPC ...... G06V 20/584; G06V 10/243; G06T 7/70; G06T 7/60
 See application file for complete search history.

(56) References Cited

U.S. PATENT DOCUMENTS

| | | | |
|---|---|---|---|
| 2020/0401824 A1 | 12/2020 | Hayashi et al. | |
| 2021/0211568 A1* | 7/2021 | Zhou | ............ G06V 10/25 |

FOREIGN PATENT DOCUMENTS

| | | |
|---|---|---|
| JP | 2016-161973 A | 9/2016 |
| JP | 2021-002275 A | 1/2021 |
| JP | 2021-76884 A | 5/2021 |

\* cited by examiner

*Primary Examiner* — Sam Bhattacharya
(74) *Attorney, Agent, or Firm* — Sughrue Mion, PLLC

(57) ABSTRACT

A signal recognizing apparatus detects a target traffic light from an image showing surroundings of a host vehicle and generates traffic light detecting information including a traffic light image. The apparatus recognizes a lighting state of the target traffic light and specifies a positional relationship between the host vehicle and the target traffic light on the basis of position information of the host vehicle and the traffic light detecting information, and determines a center of a lighting area corresponding to a lighting portion of the target traffic light in the traffic light image, and performs a predetermined conversion process on the traffic light image on the basis of the positional relationship in order to compare with the lighting pattern information, and recognizes the lighting state by comparing the center of the lighting area in a traffic light image with the lighting pattern information.

4 Claims, 3 Drawing Sheets

| Light part | Appearance in lighting | |
|---|---|---|
| | Color | Shape |
| L1 | Green | Circle |
| L2 | Yellow | Circle |
| L3 | Red | Circle |
| L4 | Green | Left Arrow |
| L5 | Green | Up Arrow |
| L6 | Green | Right Arrow |
| L1-L6 | * Black in non-lighting | |

SIGNAL RECOGNIZING APPARATUS

CROSS-REFERENCE TO RELATED APPLICATIONS

This application is based upon and claims the benefit of priority of the prior Japanese Patent Application No. 2021-110557, filed on Jul. 2, 2021, the entire contents of which are incorporated herein by reference.

BACKGROUND

1. Technical Field

The present invention relates to a technical field of a signal recognizing apparatus for recognizing a signal from an image.

2. Description of the Related Art

As this type of apparatus, for example, it has been proposed that an apparatus recognizes the lighting state of a traffic light by comparing an image of the traffic light with a lighting pattern information of the traffic light (see JP2021-002275A as Patent Literature 1).

There is room for improvement in the technique described in Patent Document 1.

SUMMARY

The present disclosure has been made in view of the above circumstances, and an object thereof is to provide a signal recognizing apparatus capable of recognizing the lighting state of the traffic light.

A signal recognizing apparatus according to an aspect of the present disclosure is that signal recognizing apparatus, which comprises a detector configured to detect a target traffic light from an image showing surroundings of a host vehicle and generate traffic light detecting information including a traffic light image showing an appearance of the target traffic light, and a recognizer configured to recognize a lighting state of the target traffic light by comparing the traffic light detecting information and lighting pattern information of the target traffic light, further comprising: a specifier configured to specify a positional relationship between the host vehicle and the target traffic light on the basis of position information of the host vehicle and the traffic light detecting information; a determinator configured to determine a center of a lighting area corresponding to a lighting portion of the target traffic light in the traffic light image; and an image convertor configured to perform a predetermined conversion process on the traffic light image on the basis of the positional relationship in order to compare with the lighting pattern information, wherein the recognizing device recognizes the lighting state by comparing the center of the lighting area in a traffic light image, which is performed by the predetermined conversion process, with the lighting pattern information.

DETAILED DESCRIPTION OF THE EMBODIMENT

Figure 1:
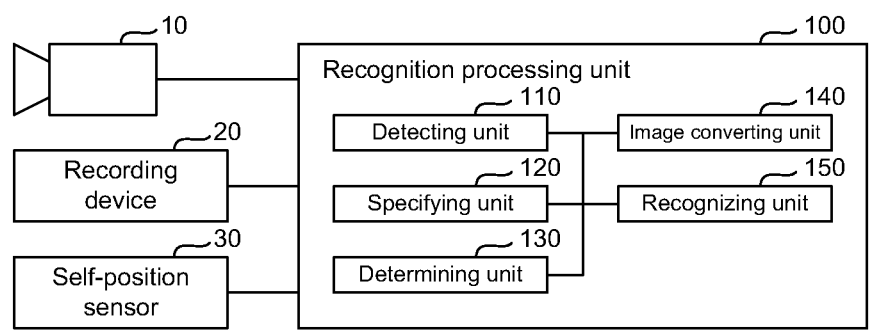
FIG. 1 illustrates a diagram showing a configuration of a vehicle according to the embodiment.
Figure 2:
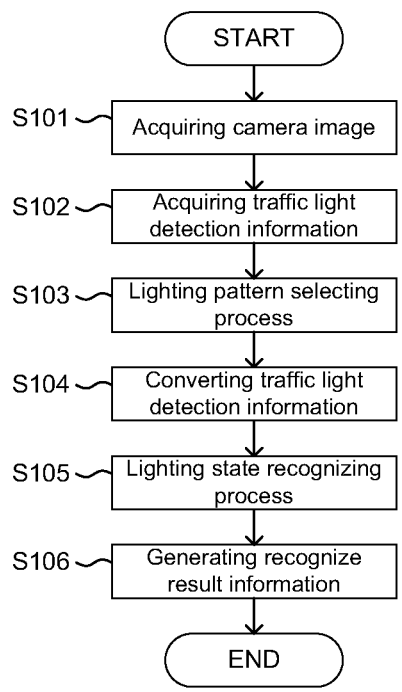
FIG. 2 illustrates a flowchart showing the operation of the recognition processing unit according to the embodiment.
Figure 3:
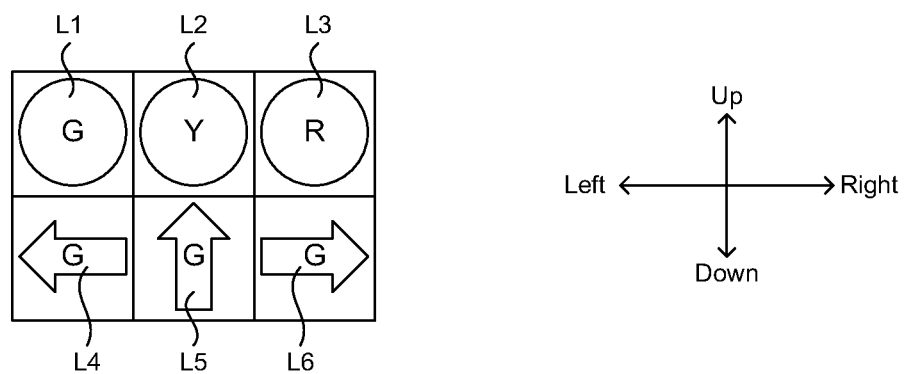
FIG. 3 illustrates a diagram showing an example of a lighting pattern information.

An embodiment of the signal recognizing apparatus will be described with reference to FIGS. 1 to 3. Here, a signal recognizing apparatus is mounted on the vehicle 1. In FIG. 1, the vehicle 1 includes the camera 10, the recording device 20, the self-position sensor 30, and the recognition processing unit 100. The recognition processing unit 100 corresponds to a specific example of the signal recognizing apparatus according to the embodiment.

The camera 10, for example, is capable of imaging the front of the vehicle 1 through the front window. The recording device 20 may be constituted by, for example, a non-volatile memory, a hard disk drive, or the like. The self-position sensor 30 is configured to be able to acquire position information indicating the position and orientation of the vehicle 1. Since various existing aspects can be applied to the camera 10, the recording device 20, and the self-position sensor 30, a description thereof will be omitted.

The recognition processing unit 100 includes the detecting unit 110, the specifying unit 120, the determining unit 130, the image converting unit 140 and the recognizing unit 150. The detecting unit 110, the specifying unit 120, the determining unit 130, the image converting unit 140 and the recognizing unit 150 may be logically implemented as, for example, a logic block. Alternatively, the detecting unit 110, the specifying unit 120, the determining unit 130, the image converting unit 140 and the recognizing unit 150 may be physically implemented as, for example, a processing circuit.

In addition to FIG. 1, the recognition processing unit 100 will be described with reference to a flowchart in FIG. 2. In FIG. 2, the recognition processing unit 100 acquires an image captured by the camera 10 (step S101).

Next, the detecting unit 110 of the recognition processing unit 100 detects the traffic light around the vehicle 1 from the image captured by the camera 10. Here, since various existing aspects can be applicable to the method of detecting the traffic light from the image, a description thereof will be omitted. The traffic light detected by the detecting unit 110 is hereinafter referred to as "target traffic light". Incidentally, when a plurality of traffic lights from the image is detected, the detecting unit 110, for example, is present in the traveling direction front of the vehicle 1, and the traffic light closest to the vehicle 1 may be referred to as the target traffic light.

The detecting unit 110 generates traffic light detection information including an image showing the appearance of the target traffic light. Consequently, the recognition processing unit 100 acquires the traffic light detecting information (step S102). The traffic light detection information may include, for example, information indicating the type and shape of the target traffic light. The traffic light detection information may include, for example, information indicating the color of the light of the target traffic light. The traffic light detection information may include, for example, information indicating the position of the target traffic light with respect to the vehicle 1.

The recognizing unit 150 of the recognition processing unit 100 selects the lighting pattern information (step S103). For example, the lighting pattern information may be recorded in the recording device 20. In this case, the recognizing unit 150 may acquire the lighting pattern information from the recording device 20. For example, lighting pattern information may be recorded in a device external to the vehicle 1. In this case, the recognizing unit 150 may acquire the lighting pattern information from an external device.

Here, the lighting pattern information is information indicating the pattern of the light part of the traffic light. "Light part" means a light emitting portion of a traffic light. The traffic light has multiple light parts. Each light part shall be turned on or off according to the operation status of the traffic light.

The lighting pattern information may include information indicative of the arrangement of the plurality of light parts. The lighting pattern information may include information indicative of the appearance of each of the plurality of light parts. The information indicating the appearance may include information indicating the color and shape of each light part (e.g., circles, arrows, etc.). The lighting pattern information may include information indicative of the relative positional relationship between the plurality of light parts.

A specific example of the lighting pattern information will be described with reference to FIG. 3, which shows the lighting pattern information of a traffic light having six light parts. Light parts L1 to L3 are parts corresponding to circular traffic lights. Light parts L1 to L3 are arranged horizontally at the upper stage. Light parts L4 to L6 are parts corresponding to arrow traffic lights. Light parts L4 to L6 are arranged horizontally at the lower stage. As shown in FIG. 3, the light parts L1 and L4 are adjacent in the vertical direction. The light parts L2 and L5 are adjacent in the vertical direction. The light parts L3 and L6 are adjacent in the vertical direction.

When lit, the appearance in lighting of the light part L1 is a blue circle. The appearance in lighting of the light part L2 is a yellow circle. The appearance in lighting of the light part L3 is a red circle. The appearance in lighting of the light part L4 is a blue left-hand arrow. The appearance in lighting of the light part L5 is a blue upper arrow. The appearance in lighting of the light part L6 is a blue right-hand arrow. When not lit, the color of each of the light parts L1 to L6 in non-lighting is black. In addition, the color of the light part in non-lighting (i.e., when not lit) may not be specified in the lighting pattern information.

A plurality of types of lighting pattern information may be prepared in advance so that the lighting pattern information can correspond to various types of traffic lights. For example, the lighting pattern information in which the light part corresponding to the circular traffic light is arranged vertically may be provided. For example, as a light part corresponding to the arrow traffic light, the lighting pattern information having only the right arrow traffic light (corresponding to the light part L6 in FIG. 3) may be prepared.

In parallel with the processing of the step S103, the processing of the step S104 described below is performed. The specifying unit 120 of the recognition processing unit 100 specifies the positional relationship between the vehicle 1 and the target traffic light. Specifically, the specifying unit 120 first acquires the position information acquired by the self-position sensor 30 and the map information. Here, the map information may be a map information showing a planar (i.e., two-dimensional) map, or may be a high-precision three-dimensional map information. When the map information is high-precision three-dimensional map information, the specifying unit 120 may acquire the map information from an external device, for example, via a network.

The specifying unit 120 then identifies (or estimates) the position of the target traffic light from the position and the map information of the vehicle 1 indicated by the position information. The position of the target traffic light identified at this time may be an absolute position (or absolute coordinates). The specifying unit 120 identifies (or estimates) the inclination of the surface including the light part (or the light emitting portion) of the target traffic light with respect to the vehicle 1 from the position and orientation of the vehicle 1 indicated by the position information and the position of the specific target traffic light.

The determining unit 130 of the recognition processing unit 100, from an image showing the appearance of the target traffic light included in the traffic light detection information, detects a lighting area corresponding to the portion (hereinafter, appropriately referred to as "lighting portion") which is lighting out of the light parts of the target traffic light. The determining unit 130 determines the center of the detected lighting area. When there is a plurality of light areas, the determining unit 130 determines the center of each lighting area. The determining unit 130 may determine the center of the lighting area on the basis of the luminance value according to the lighting area, for example. In this case, the determining unit 130 may determine the center of the lighting area on the basis of the brightness value, which may be the maximum pixel. Alternatively, the determining unit 130 may determine the center of the lighting area on the basis of, for example, the size of the lighting area (e.g., width and height).

Figure 4A:
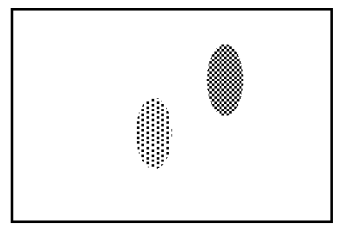
FIG. 4A illustrates a diagram for explaining a concept of an image conversion process according to the embodiment.

Here, the operation of the determining unit 130 will be described with reference to FIG. 3. For example, at night, when a traffic light is imaged by the camera 10, flare may occur because the light of the traffic light (i.e., the light of the lighting light part) is relatively strong. Then, for example, as shown in FIG. 4A, the region corresponding to the light of the traffic light in the image (see shaded portion) may be larger than the size of the lighting light part.

Figure 4B:
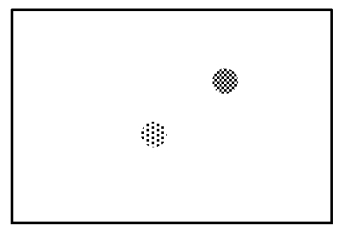
FIG. 4B illustrates a diagram for explaining a concept of an image conversion process according to the embodiment.

The determining unit 130, for example, in order to reduce the influence of the flare, determines the center of the lighting area described above. For example, the shaded portion in the image shown in FIG. 4B corresponds to the center of the lighting area determined by the determining unit 130.

The image converting unit 140 of the recognition processing unit 100 performs image conversion processing on an image indicating the appearance of the target traffic light on the basis of the inclination of the surface including the light part of the target traffic light specified by the specifying unit 120 with respect to the vehicle 1. Specifically, the image converting unit 140, so as to be able to compare the image and the light pattern indicating the appearance of the target traffic light, as an image conversion process, for example, the angle conversion of the image indicating the appearance of the target traffic light.

Figure 4C:
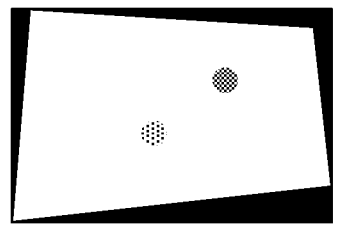
FIG. 4C illustrates a diagram for explaining a concept of an image conversion process according to the embodiment.
Figure 4D:
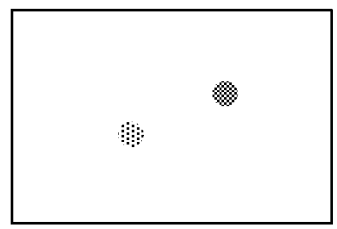
FIG. 4D illustrates a diagram for explaining a concept of an image conversion process according to the embodiment.

As a result, an image captured from a position inclined with respect to the front of the target traffic light (see FIG. 4C), for example, can be converted to an image captured from the front of the target traffic light (see FIG. 4D).

Incidentally, since various existing aspects can be applied to the image conversion process, a description thereof will be omitted.

Figure 4E:
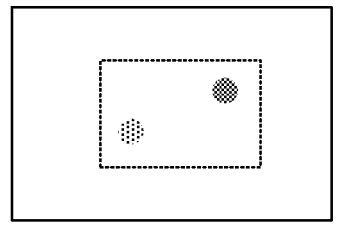
FIG. 4E illustrates a diagram for explaining a concept of an image conversion process according to the embodiment.

Thereafter, the recognizing unit 150 recognizes the lighting state of the target traffic light (step S105). Specifically, the recognizing unit 150 extracts a predetermined area including the target traffic light (e.g., an area surrounded by a dotted line frame in FIG. 4E) from the image to which the image conversion process is performed in the processing of the step S104. The recognizing unit 150 compares the center of the lighting area in the extracted area with the lighting pattern information selected in the process of the step S103.

The recognizing unit 150, for example, as shown in the image of FIGS. 4A-4E, recognizes the light parts L3 and L4 (see FIG. 3) are turned on, and the light parts L1, L2, L5 and L6 (see FIG. 3) are turned off. That is, the recognizing unit 150 recognizes that the red circular traffic light and the blue left arrow traffic light is lit up.

Thereafter, the recognition processing unit 100 generates the recognition result information indicating the lighting state recognized by the recognizing unit 150 (step S106). The recognition result information may be utilized for, for example, a red traffic light alerting function for notifying a red traffic light to the driver of the vehicle 1, a deceleration support function for automatically decelerating the vehicle 1 when it is a red traffic light, or the like.

Technical Effects

For example, when recognizing the lighting state of the traffic light from an image captured by a camera such as the camera 10, the following problems may occur. Recognition result of the lighting state of the traffic light may be utilized, for example, for driving assistance or the like. In order to appropriately implement driving support, etc., it is necessary to recognize the lighting state of the target traffic light from the image captured at a position several tens of meters away from the target traffic light. On the other hand, in the image captured at a relatively distant position from the target traffic light, for example, there is a possibility that the lighting state of the arrow traffic light is not correctly recognized. In contrast, the technique of improving the resolution of the camera is considered. However, increasing camera resolution poses a new problem of increased product cost.

By comparing the image and the lighting pattern information obtained by imaging the target traffic light, the recognition processing unit 100 recognizes the lighting state of the target traffic light. According to this technique, from the image captured by the camera 10, for example, even when the direction of the arrow of the arrow traffic light can not be recognized, it is possible to appropriately recognize the lighting state of the target traffic light. That is, with the recognition processing unit 100, even from an image captured by a relatively low resolution camera, it is possible to appropriately recognize the lighting state of the target traffic light.

Furthermore, the following problems may occur. For example, if a vehicle is running on a road with multiple lanes, a traffic light may not be located in front of the vehicle. In other words, it is not always possible to image the target traffic light from its front. Also, for example, at night, there is a possibility that flare is generated due to the light of the target traffic light. Therefore, it may be difficult to appropriately compare the image and the lighting pattern information obtained by imaging the target traffic light.

In contrast, in the recognition processing unit 100 described above, together with the center of the lighting area that is determined by the determining unit 130, the image conversion process is performed by the image converting unit 140. Therefore, according to the recognition processing unit 100, or when the target traffic light can not be imaged directly from its front, or even when flare occurs, it is possible to appropriately compare the image captured by the camera 10 and the lighting pattern. As a result, the recognition processing unit 100 can appropriately recognize the lighting state of the target traffic light.

Aspects of the invention derived from the embodiments described above will be described below.

A signal recognizing apparatus according to an aspect of the present disclosure comprises a detector configured to detect a target traffic light from an image showing surroundings of a host vehicle and generate traffic light detecting information including a traffic light image showing an appearance of the target traffic light, and a recognizer configured to recognize a lighting state of the target traffic light by comparing the traffic light detecting information and lighting pattern information of the target traffic light, further comprising: a specifier configured to specify a positional relationship between the host vehicle and the target traffic light on the basis of position information of the host vehicle and the traffic light detecting information; a determinator configured to determine a center of a lighting area corresponding to a lighting portion of the target traffic light in the traffic light image; and an image converter configured to perform a predetermined conversion process on the traffic light image on the basis of the positional relationship in order to compare with the lighting pattern information, wherein the recognizer recognizes the lighting state by comparing the center of the lighting area in a traffic light image, which is performed the predetermined conversion process, with the lighting pattern information.

In the above-described embodiment, the "recognition processing unit 100" corresponds to an example of the "signal recognizing apparatus", the "detecting unit 110" corresponds to an example of the "detector", the "recognizing unit 150" corresponds to an example of the "recognizer", the "specifying unit 120" corresponds to an example of the "specifier", the "determining unit 130" corresponds to an example of the "determinator", and the "image converting unit 140" corresponds to an example of the "image converter".

In the signal recognizing apparatus, the determinator may determine the center of the lighting area on the basis of the brightness value according to the lighting area. Alternatively, in the signal recognizing apparatus, the determinator may determine the center of the lighting area on the basis of the size of the lighting area.

In the signal recognizing apparatus, the predetermined conversion process may include an angle conversion process on the basis of a relative angle between the host vehicle and the target traffic light indicated by the positional relationship.

The present invention is not limited to the embodiments described above, but can be appropriately changed to the extent that it is not contrary to the summary or philosophy of the invention that can be read from the scope of the claims and the entire description, and a signal recognizing apparatus with such a change is also included in the technical scope of the present invention.

What is claimed is:
1. A signal recognizing apparatus, comprising:
   a detector configured to detect a target traffic light from an image showing surroundings of a host vehicle and generate traffic light detecting information including a traffic light image showing an appearance of the target traffic light;
a recognizer configured to recognize a lighting state of the target traffic light by comparing the traffic light detecting information and lighting pattern information of the target traffic light;
a specifier configured to specify a positional relationship between the host vehicle and the target traffic light on the basis of position information of the host vehicle and the traffic light detecting information;
a determinator configured to determine a center of a lighting area corresponding to a lighting portion of the target traffic light in the traffic light image; and
an image converter configured to perform a predetermined conversion process on the traffic light image on the basis of the positional relationship in order to compare with the lighting pattern information,
wherein the recognizer recognizes the lighting state by comparing the center of the lighting area in a traffic light image, which is performed the predetermined conversion process, with the lighting pattern information.

2. The signal recognizing apparatus according to claim 1, wherein the determinator determines the center of the lighting area on the basis of brightness value of the lighting area.

3. The signal recognizing apparatus according to claim 1, wherein the determinator determines the center of the lighting area on the basis of size of the lighting area.

4. The signal recognizing apparatus according to claim 1, wherein the predetermined conversion process includes an angle conversion process on the basis of a relative angle between the host vehicle and the target traffic light indicated by the positional relationship.

* * * * *